United States Patent
Allen et al.

(10) Patent No.: US 9,948,802 B2
(45) Date of Patent: Apr. 17, 2018

(54) ROBOTIC DOCUMENT FEEDER

(71) Applicant: Mentalix, Inc., Plano, TX (US)

(72) Inventors: Thomas Allen, Dallas, TX (US); Ravi Gattamaraju, Richardson, TX (US); Brian Gross, Wyomissing, PA (US); Dalton McFarling, Fairview, TX (US); Hiep Nguyen, McKinney, TX (US); Dale Remmers, Plano, TX (US); Ashish Thapa, Irving, TX (US)

(73) Assignee: Mentalix, Inc., Dallas, TX (US)

(*) Notice: Subject to any disclaimer, the term of this patent is extended or adjusted under 35 U.S.C. 154(b) by 0 days.

(21) Appl. No.: 15/189,950

(22) Filed: Jun. 22, 2016

(65) Prior Publication Data

US 2016/0304303 A1 Oct. 20, 2016

Related U.S. Application Data

(63) Continuation-in-part of application No. 15/080,045, filed on Mar. 24, 2016.
(Continued)

(51) Int. Cl.
*H04N 1/00* (2006.01)
*B65H 1/04* (2006.01)
(Continued)

(52) U.S. Cl.
CPC ...... *H04N 1/00591* (2013.01); *B25J 15/0616* (2013.01); *B65H 1/04* (2013.01);
(Continued)

(58) Field of Classification Search
CPC .. B65H 3/0808; B65H 3/0816; B65H 3/0883; B65H 29/32; B65H 29/241; B65H 83/00;
(Continued)

(56) References Cited

U.S. PATENT DOCUMENTS 3,411,770 A * 11/1968 Albright .................. B65H 3/14
  271/97
3,880,297 A * 4/1975 Martin ................. B65H 29/248
  271/195

(Continued)

OTHER PUBLICATIONS

Presentation at UT Dallas campus given on May 2, 2014, YouTube video of presentation can be seen at https://www.youtube.com/watch?v=oiLskUytPDU.

*Primary Examiner* — Ernesto A Suarez
(74) *Attorney, Agent, or Firm* — Scott L. Harper; Smitha Mathews Harper Bates & Champion LLP

(57) ABSTRACT

A system may include a robotic arm and a Bernoulli cup assembly powered by a vacuum source and coupled to the robotic arm. The Bernoulli cup assembly may lift a document, and the robotic arm may move the Bernoulli cup assembly with the lifted document to a document scanner for imaging the document. The system may further include an input bin, a base supported by a platform and disposed over an imaging surface of the document scanner, and an output bin. A method may include lifting a document from an input bin via suction pressure using a Bernoulli cup assembly, robotically moving the Bernoulli cup assembly with the lifted document to a document scanner, and scanning the document. The method may further include robotically moving the Bernoulli cup assembly with the lifted document away from the document scanner, and de-activating the suction pressure to release the document.

2 Claims, 18 Drawing Sheets

Related U.S. Application Data

(60) Provisional application No. 62/138,814, filed on Mar. 26, 2015.

(51) Int. Cl.
| | | |
|---|---|---|
| *B65H 1/14* | (2006.01) | |
| *B65H 29/24* | (2006.01) | |
| *B65H 31/02* | (2006.01) | |
| *B65H 1/18* | (2006.01) | |
| *B65H 3/08* | (2006.01) | |
| *B65H 5/10* | (2006.01) | |
| *H04N 1/04* | (2006.01) | |
| *B25J 15/06* | (2006.01) | |

(52) U.S. Cl.
CPC ............ *B65H 1/14* (2013.01); *B65H 1/18* (2013.01); *B65H 3/0816* (2013.01); *B65H 3/0883* (2013.01); *B65H 5/10* (2013.01); *B65H 29/241* (2013.01); *B65H 31/02* (2013.01); *H04N 1/0062* (2013.01); *H04N 1/00551* (2013.01); *H04N 1/00559* (2013.01); *H04N 1/00588* (2013.01); *H04N 1/00607* (2013.01); *H04N 1/04* (2013.01); *B65H 2301/4212* (2013.01); *B65H 2403/544* (2013.01); *B65H 2406/34* (2013.01); *B65H 2406/3661* (2013.01); *B65H 2555/30* (2013.01); *B65H 2801/39* (2013.01)

(58) Field of Classification Search
CPC .......... B65H 83/02; B65H 2301/44336; B65H 2301/4422; B65H 2301/44724; B65H 2404/6551; B65H 2405/51; B65H 2405/52; B65H 2406/34; B65H 2406/341; B65H 2406/342; B65H 2406/343; B65H 2406/344; H04N 1/00551; H04N 1/00057; H04N 1/00588; H04N 1/00591; H04N 1/00596; H04N 1/00607; G03G 15/60; G03G 15/602; G03G 15/605; G03G 2215/00177; G03G 2215/00185
See application file for complete search history.

(56) References Cited

U.S. PATENT DOCUMENTS

| | | | | |
|---|---|---|---|---|
| 4,389,117 | A * | 6/1983 | Floyd | B65H 3/0808 |
| | | | | 355/87 |
| 4,451,144 | A * | 5/1984 | Gensike | G03B 27/08 |
| | | | | 355/29 |
| 4,564,553 | A * | 1/1986 | Pellegrini | C08K 5/092 |
| | | | | 428/364 |
| 4,674,867 | A * | 6/1987 | Kitai | G03B 27/73 |
| | | | | 271/90 |
| 5,055,875 | A | 10/1991 | Fischer | |
| 5,988,629 | A | 11/1999 | Burlew | |
| 6,467,895 | B1 | 10/2002 | Burnes | |
| 6,652,217 | B2 | 11/2003 | Dettman | |
| 7,748,619 | B2 * | 7/2010 | Martin | B65H 3/0816 |
| | | | | 221/92 |
| 8,253,986 | B2 | 8/2012 | Ikeno | |
| 8,845,839 | B2 | 9/2014 | Yuhara | |
| 9,233,812 | B2 * | 1/2016 | Martin | B65H 1/28 |
| 2014/0147239 | A1 | 5/2014 | Miyoshi | |
| 2014/0305847 | A1 | 10/2014 | Kudrus | |

\* cited by examiner

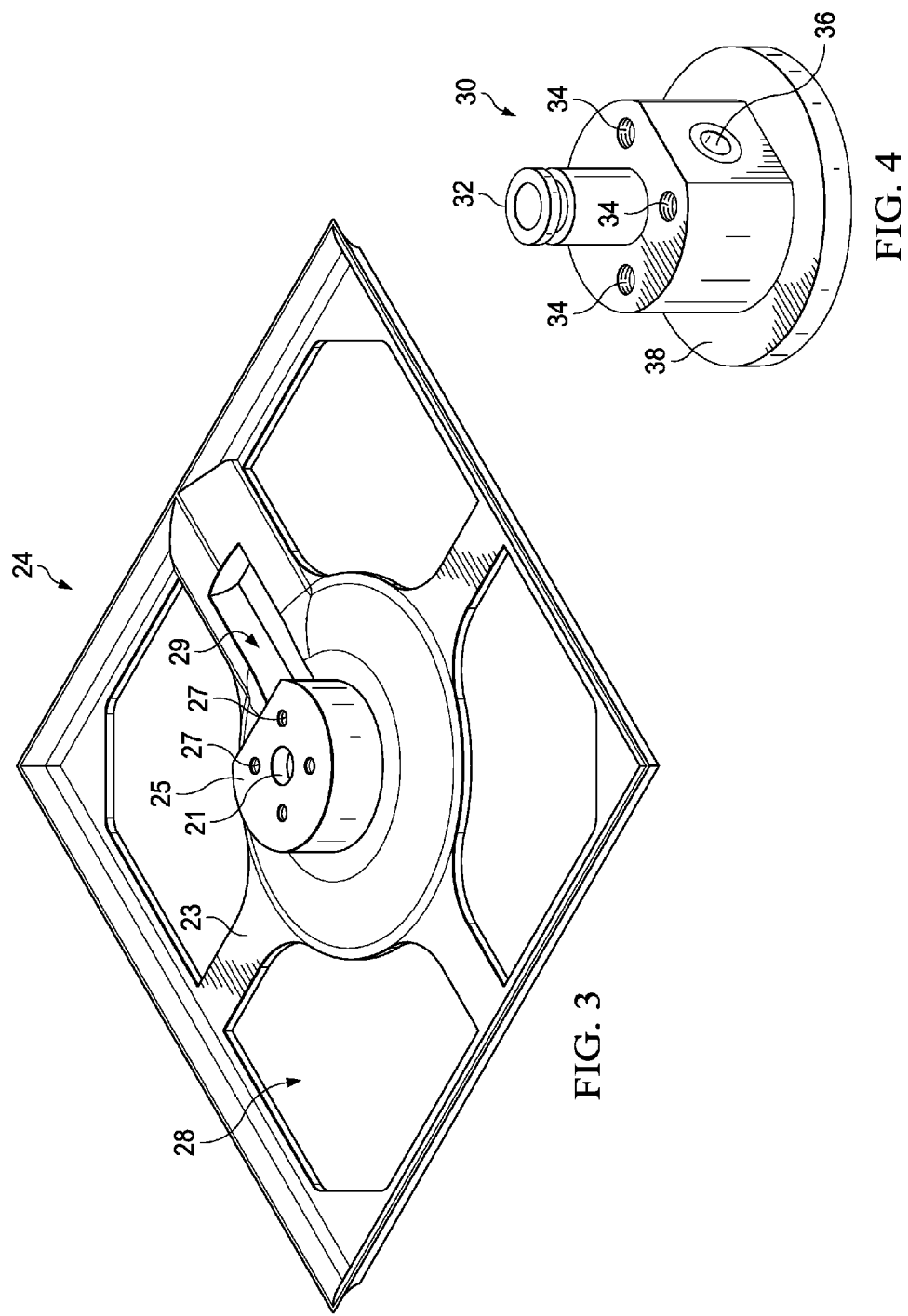

ROBOTIC DOCUMENT FEEDER

CROSS-REFERENCE TO RELATED APPLICATIONS

This application is a continuation-in-part of U.S. patent application Ser. No. 15/080,045, filed Mar. 24, 2016 and entitled "Robotic Document Feeder", which claims the benefit of U.S. Provisional Patent Application Ser. No. 62/138,814 filed Mar. 26, 2015 and entitled "Robotic Document Feeder", each of which is hereby incorporated by reference for all purposes.

BACKGROUND

Fingerprint cards are collected and stored by law enforcement and other governmental agencies for use in later identifying people by their fingerprints. Fingerprint cards have conventionally been stored in a paper format, but with the advent of scanners and computer storage, including network cloud based storage, fingerprint cards may now be imaged from a paper format for storage in an electronic format.

To ensure consistent image quality, law enforcement and governmental agencies may limit such imaging to the use of certain types of scanners, some of which may not have built-in automatic document feeder devices, and some of which may not easily or economically be retrofitted to include automatic document feeder devices. Without such automatic document feeder devices, human operators may be utilized to complete the imaging process, which is slower and more costly than using an automated solution. As such, a need exists for an economical automated solution that increases the document imaging capacity and reduces the involvement of human operators.

SUMMARY

In accordance with the present disclosure, an implementation of a robotic document feeder system comprises a robotic arm and a Bernoulli cup assembly powered by a vacuum source and coupled to the robotic arm. In an embodiment, the robotic arm is operable to move linearly but not rotationally. When the vacuum source is activated, the Bernoulli cup assembly may create sufficient suction pressure to lift a document. The robotic arm may be configured to move the Bernoulli cup assembly with the lifted document to a document scanner for imaging the document. The system may further comprise an input bin, and the robotic arm may be configured to move the Bernoulli cup assembly over the input bin to lift the document from the input bin. In an embodiment, the input bin further comprises a moveable tray for supporting a plurality of documents within the input bin and a raising mechanism for lifting the moveable tray and the plurality of documents within the input bin. In an embodiment, the raising mechanism includes at least one motor driven pulley system coupled to the moveable tray. The system may further comprise an output bin, and the robotic arm may be configured to move the Bernoulli cup assembly with the lifted document over the output bin after the document has been scanned. In an embodiment, the system further comprises a platform with legs supporting a base positioned over the imaging surface of the document scanner. A designated scan area may be formed as a through opening in the base. The system may further comprise a slide mechanism operable to retract below a portion of the base and extend across the through opening of the base. The system may further comprise at least one sensor for confirming the Bernoulli cup assembly lifted the document.

In accordance with the present disclosure, another implementation of the robotic document feeder system comprises a robotic arm coupled to a Bernoulli cup assembly powered by a vacuum source, an input bin for storing at least one document, a base disposed over an imaging surface of a document scanner and supported by a platform, and an output bin. In an embodiment, the robotic arm is operable to move linearly but not rotationally. The base may include a designated scan area through which a document may be imaged by the document scanner. The system may further include a slide mechanism operable to retract below a portion of the base and extend across the designated scan area. In an embodiment, when the vacuum source is activated, the Bernoulli cup assembly creates sufficient suction pressure to lift a document from the input bin. In an embodiment, the robotic arm is configured to move the Bernoulli cup assembly with the lifted document from the input bin to the designated scan area for imaging the document with the document scanner. In an embodiment, the robotic arm is configured to move the Bernoulli cup assembly with the lifted document from the designated scan area to the output bin. In an embodiment, when the vacuum source is de-activated, the Bernoulli cup assembly releases the document into the output bin.

In accordance with the present disclosure, an implementation of a method comprises lifting a document from an input bin via suction pressure using a Bernoulli cup assembly, robotically moving the Bernoulli cup assembly with the lifted document to a document scanner, and scanning the document. The method may further comprise robotically moving the Bernoulli cup assembly with the lifted document away from the document scanner, and de-activating the suction pressure to release the document from the Bernoulli cup assembly. In an embodiment, the method further comprises robotically moving the Bernoulli cup assembly back to the input bin. The method may further comprise raising the document within the input bin before lifting the document via suction pressure using the Bernoulli cup assembly. In an embodiment, the method further comprises covering an imaging surface of the document scanner except for a designated scan area before robotically moving the Bernoulli cup assembly within the lifted document to the document scanner. The method may further comprise determining via a sensor whether the document was successfully lifted via suction pressure using the Bernoulli cup assembly.

The details of one or more implementations are set forth in the accompanying drawings and the description below. Other features and advantages of the implementations will be apparent from the description and drawings.

BRIEF DESCRIPTION OF THE DRAWINGS

FIG. 3 depicts an isometric view of a Bernoulli cup assembly frame and white background of the robotic document feeder system of FIG. 1 according to the present disclosure;

FIG. 4 depicts an isometric view of a Bernoulli suction cup of the robotic document feeder system of FIG. 1 according to the present disclosure;

DETAILED DESCRIPTION

Figure 1:
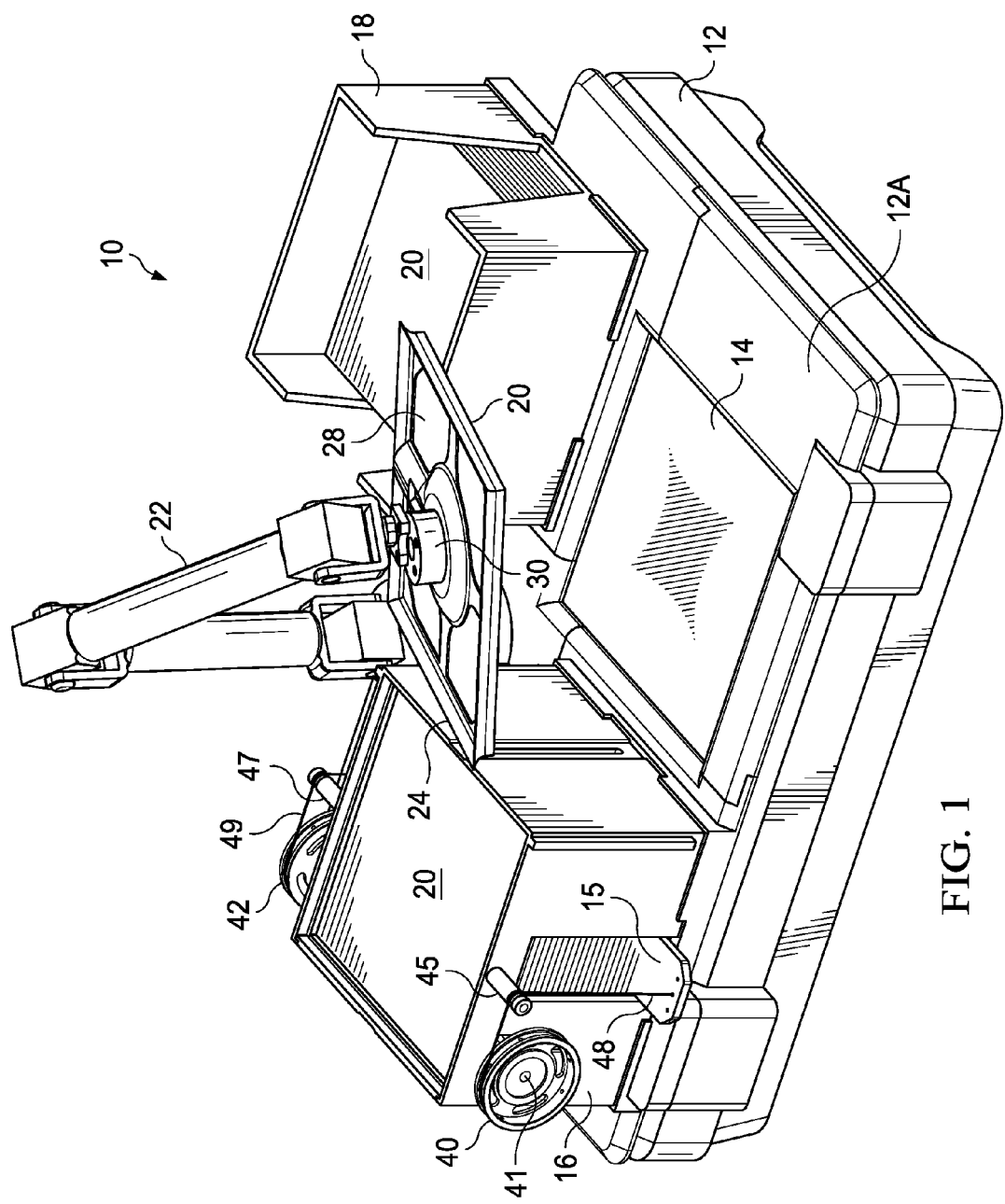
FIG. 1 depicts an isometric view of an embodiment of a robotic document feeder system with a robotic arm that moves rotationally according to the present disclosure.

FIG. 1 depicts an isometric view of a rotational embodiment of a robotic document feeder system (10) according to the present disclosure. The robotic document feeder system (10) comprises a robotic arm (22) coupled to a Bernoulli cup assembly (24), an input bin (16) for storing fingerprint cards (20) or other documents before imaging, a scanner cover (12A) including a through opening or scan area (14) where the fingerprint cards (20) or other documents are imaged using the scanner (12), and an output bin (18) for receiving the fingerprint cards (20) after imaging.

The robotic document feeder system (10) comprises an automated system designed to scan individual documents, such as fingerprint cards (20). As described in more detail herein, the robotic arm (22) positions the Bernoulli cup assembly (24) to pick up and secure a fingerprint card (20) from the input bin (16) via suction created by a vacuum source. In an embodiment, a photocell may be provided on the input bin (16) to ensure the card (20) has been successfully picked up. The robotic arm (22) then rotates and translates accordingly to place the Bernoulli cup assembly (24) with the lifted card (20) into the scan area (14) of the scanner cover (12A) for imaging using the scanner (12). After the scan is complete, the card (20) is picked up by the Bernoulli cup assembly (24). In an embodiment, a photocell may be provided on the robotic arm (22) to ensure the card (20) has been successfully picked up from the scanner (12). Then the robotic arm (22) rotates and translates accordingly to place the Bernoulli cup assembly (24) with the lifted card (20) over the output bin (18). Then the vacuum source is de-activated and the Bernoulli cup assembly (24) releases the lifted card (20) into the output bin (18) for retrieval and storage by the operator. Thus, the robotic document feeder system (10) uses suction to move and position each of the cards (20) for imaging rather than transporting the cards (20) through a series of rollers as in standard automatic document feeders. The disclosed system and method thereby reduces or eliminates paper jams and potential damage to the fingerprint cards (20). In an embodiment, the described process of picking up a card (20), scanning the card (20), and releasing the card into the output bin (18) takes approximately 55 to 60 seconds. In an embodiment, the robotic document feeder system (10) operates to consistently pick up a fingerprint card (20) and create an acceptable image within a ±0.5% tolerance for error.

The robotic arm (22) may comprise a plurality of servo-motors to control its base, shoulder, elbow, and wrist, respectively. In an embodiment, the robotic arm (22) is a Lynxmotion AL5D with RIOS. In an embodiment, the robotic arm (22) supports approximately 0.5 lbs. of weight in the Bernoulli cup assembly (24). A tension spring (26) may be provided between the scanner cover (12A) and the robotic arm (22) to assist the robotic arm (22) with the weight of the Bernoulli cup assembly (24) during operation.

Figure 2:
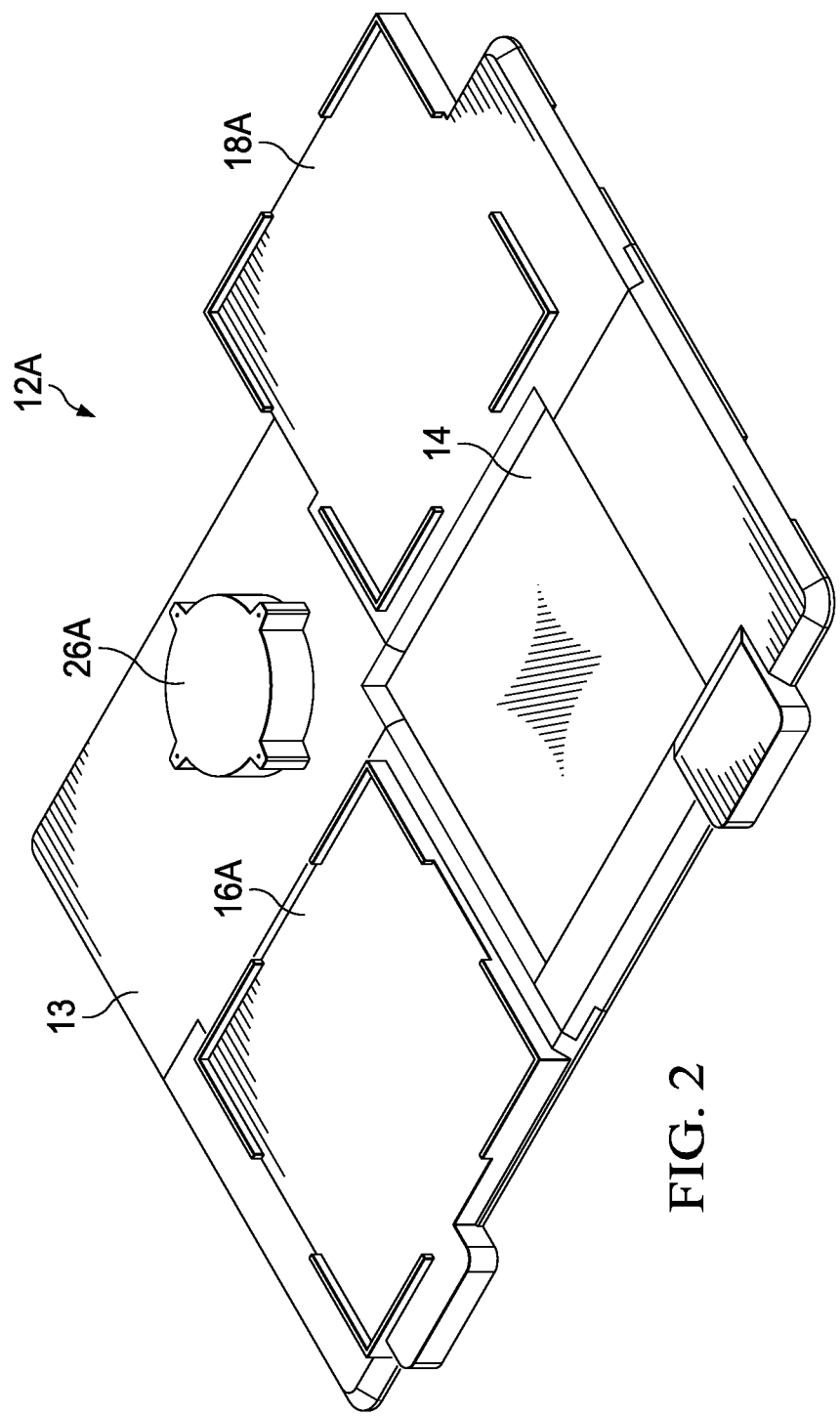
FIG. 2 depicts an isometric view of a scanner cover of the robotic document feeder system of FIG. 1 according to the present disclosure.

FIG. 2 depicts an isometric view of the scanner cover (12A) of the robotic document feeder system (10) of FIG. 1 according to the present disclosure. The scanner cover (12A) provides a support platform for the robotic arm (22) and other components, and the scanner cover (12A) also aids in producing consistent image size and quality by covering over substantially all areas of the imaging surface of the scanner (12) except for a designated scan area (14), which may be formed as a through opening in the scanner cover (12A). In an embodiment, the scan area (14) may be sized to correspond to that portion of the fingerprint card (20) or other document that will be imaged for electronic storage. In an embodiment, the scanner cover (12A) may optionally include one or more of an input box platform (16A), an output box platform (18A), and a raised fitting (26A) for coupling the robotic arm (22) to the scanner cover (12A). In an embodiment, the input box (16), the robotic arm (22), and the output box (18) may be positioned on the scanner cover (12A) to shorten the distance of travel for the cards (20), enable the robotic arm (22) sufficient degrees of freedom to perform smoothly, and provide the operator a robotic document feeder system (10) that can easily be transferred to multiple locations.

FIG. 3 and FIG. 4 depict isometric views of the components forming the Bernoulli cup assembly (24) of the robotic document feeder system of FIG. 1 according to the present disclosure. In particular, FIG. 3 depicts the frame (23) and a white background (28) of the Bernoulli cup assembly (24), and FIG. 4 depicts the Bernoulli suction cup (30) of the Bernoulli cup assembly (24).

Referring now to FIG. 3, in an embodiment, the frame (23) may comprise a generally square exterior with a generally cross-shaped interior leaving open spaces within the interior to reduce the weight of the Bernoulli cup assembly (24). To ensure scanning quality, a white background (28) may be coupled across the underside of the frame (23) to cover the open spaces within the interior of the frame (23). During scanning, the white background (28) is in contact with the back of the fingerprint card (20) and thereby covers the fingerprint card (20). This tends to enhance the quality of the image since the white background (28) limits light from leaking past the card (20) into the operating environment and producing unwanted shadows when the card (20) is scanned. The frame (23) may further comprise a generally centrally located raised component (25) with a port (21) and bolt holes (27) therein for coupling the Bernoulli suction cup (30) to the frame (23). The frame (23) may further comprise an opening (29) adjacent the raised component (25) for receiving an air line that couples between the vacuum source and the Bernoulli suction cup (30). In addition, the frame (23) may include a photo sensor to determine whether or not a card (20) was successfully retrieved.

Referring now to FIG. 4, in an embodiment, the Bernoulli suction cup (30) may comprise a base (38) with a suction area on a lower surface thereof. The Bernoulli suction cup (30) may further comprise an air chamber (36) in fluid communication with the suction area of the base (38). The air chamber (36) is operable to receive an air line from a vacuum source. The Bernoulli suction cup (30) may further comprise a generally centrally located fitting (32) that extends through the port (21) in the raised component (25) of the frame (23) and couples the Bernoulli cup assembly (24) to the robotic arm (22) as shown in FIG. 1. The Bernoulli suction cup (30) may also comprise a plurality of bolt holes (34) that align with the bolt holes (27) in the raised component (25) of the frame (23) for coupling the Bernoulli suction cup (30) to the frame (23).

The Bernoulli suction cup (30) applies the Bernoulli Principle to retrieve and release the fingerprint card (20). In an embodiment, the Bernoulli suction cup (30) is a Festo 60 mm contactless Bernoulli suction cup operable to lift a fingerprint card (20) utilizing 40 psi of suction pressure. An oil-free compressor may be used as the vacuum source. In an embodiment, the vacuum source is a California Air Compressor operable to provide at least 40 psi of suction pressure at 60 dB noise level. In an embodiment, a 12 V solenoid pneumatic shut-off valve may be coupled to the vacuum source to regulate when the Bernoulli cup assembly (24) receives suction pressure.

Figure 5:
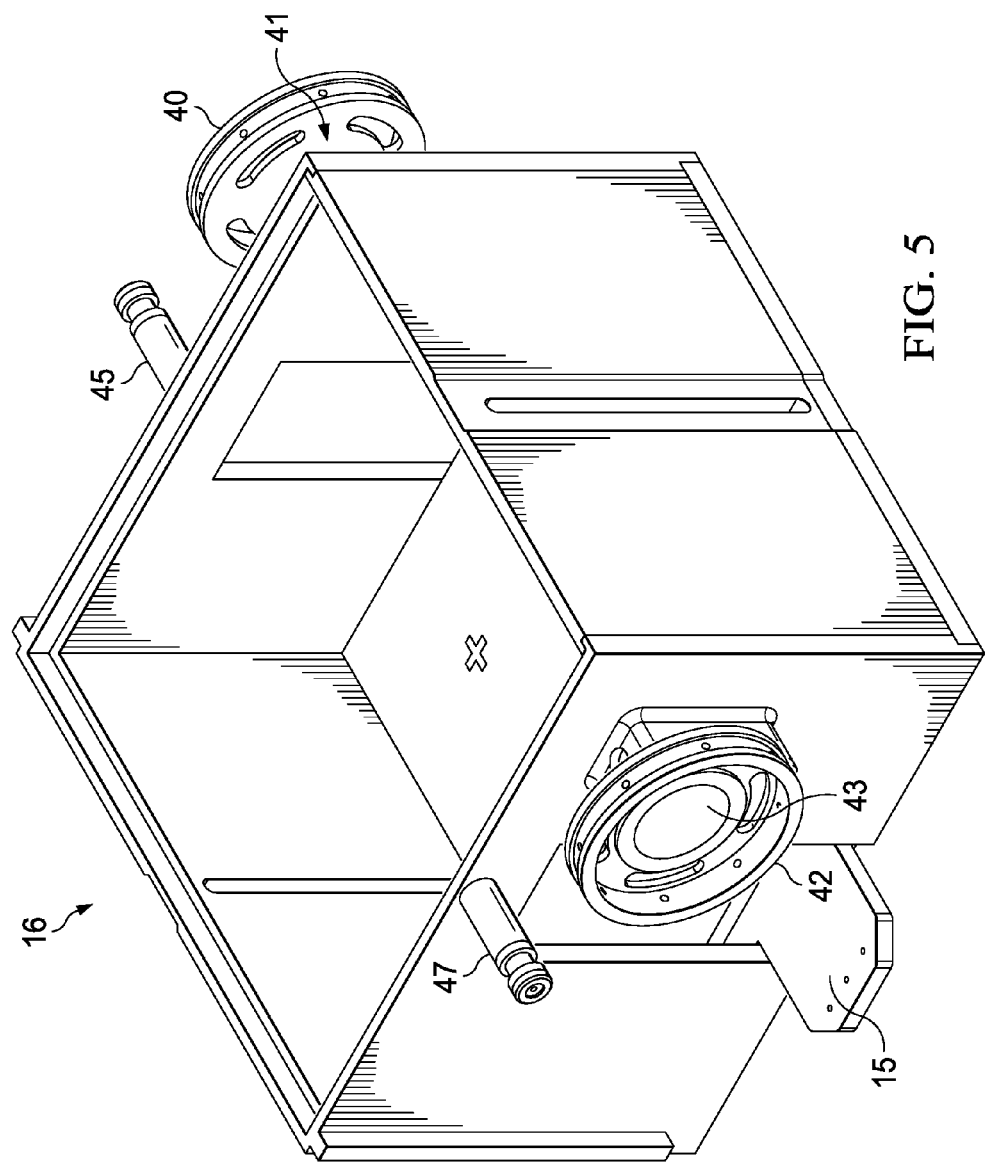
FIG. 5 depicts an isometric view of an input bin of the robotic document feeder system of FIG. 1 according to the present disclosure.
Figure 6:
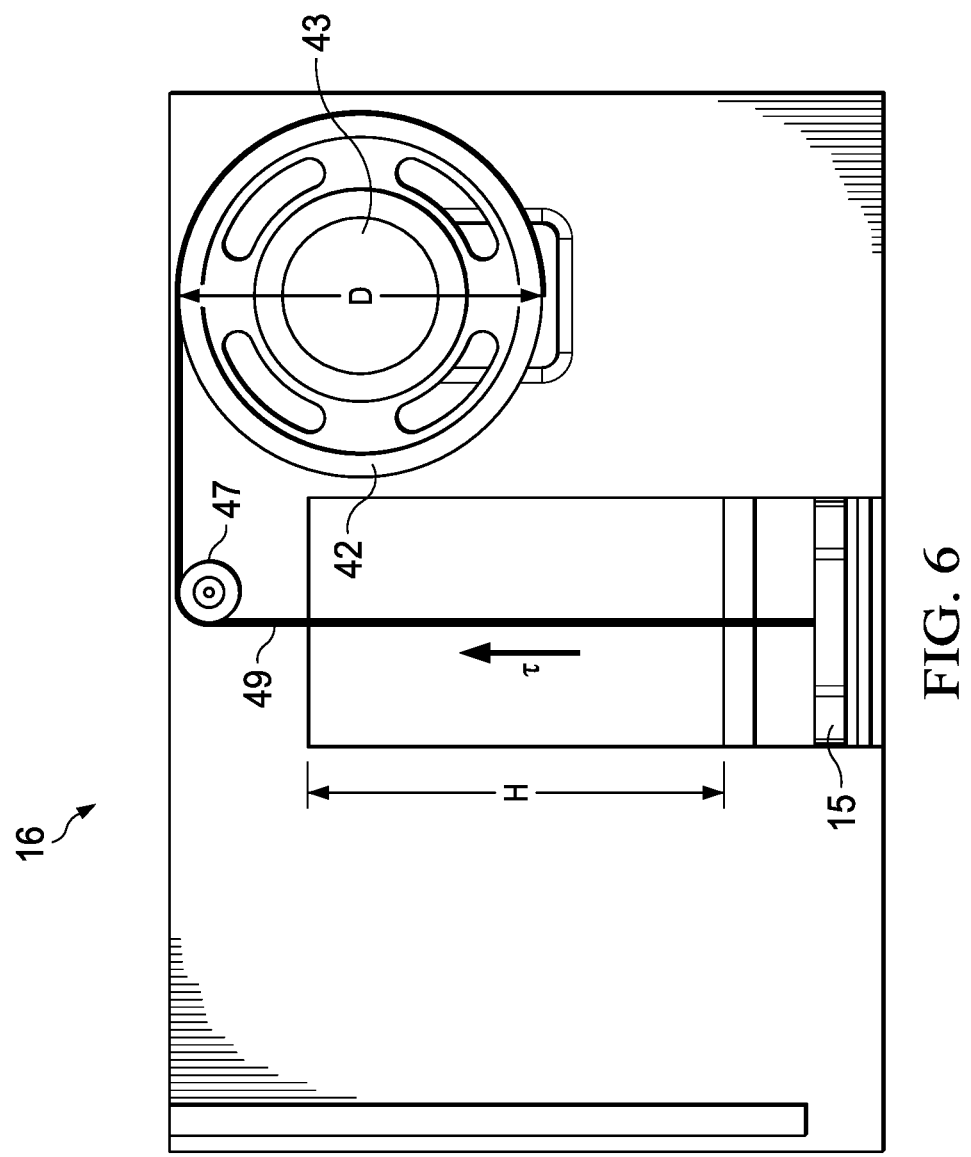
FIG. 6 depicts a side plan view of the input bin of FIG. 5 according to the present disclosure.

FIG. 5 depicts an isometric view, and FIG. 6 depicts a side plan view, of the input bin (16) of the robotic document feeder system (10) of FIG. 1 according to the present disclosure. The input bin (16) supports a plurality of fingerprint cards (20) therein. The input bin (16) may be designed to raise the cards (20) vertically as each card (20) is removed from the input bin (16) for scanning. The input bin (16) may include a whisker sensor for determining the level of cards (20) present within the input bin (16). The input bin (16) may further include a photocell for confirming whether or not a card (20) was retrieved from the input bin (16) during operation.

In an embodiment, the input bin (16) comprises a raising mechanism that includes a moveable tray (15) that supports the cards (20), two opposing drive pulleys (40), (42) each driven by respective servomotors (41), (43), and two opposing pulley pegs (45), (47) each supporting a respective pulley line (48), (49). As best shown in FIG. 1 and FIG. 6, the pulley lines (48), (49) are each wrapped around the respective drive pulleys (40), (42) at one end and over the pulley pegs (45), (47) to couple at an opposite end to the moveable tray (15). In operation, the servomotors (41), (43) are operated substantially simultaneously to rotate the drive pulleys (40), (42) and thereby raise the moveable tray (15) via the pulley lines (48), (49) as the pulley lines (48), (49) wrap around the drive pulleys (40), (42). In this manner, the cards (20) are incrementally raised to the top of the input bin (16) such that the robotic arm (22) and Bernoulli cup assembly (24) may be positioned at the same location over the input bin (16) each time to retrieve the next card (20).

Referring now to FIG. 6, since the two servomotors (41), (43) only allow 180 degrees of rotation, to ensure the last card (20) is raised to the top of the input bin (16), the average height (H) of the number of cards the input bin (16) can hold should be set equal to half the circumference (π×D/2) of the drive pulleys (40), (42). Then the diameter (D) of the drive pulleys can be determined using the following Equation (1):

$$(\pi \times D)/2 = H$$

$$D = (2 \times H)/\pi \quad \text{Equation (1)}$$

To hold the weight (W) of the number of cards the input bin (16) can hold, the dynamic torque (τ_d) applied by the two servomotors (41), (43) combined must be greater than the torque created by the average weight of the cards (W) relative to the radius (D/2) of the drive pulleys (40), (42). The dynamic torque can be determined using the following Equation (2):

$$\tau\_d = D/2 \times W \quad \text{Equation (2)}$$

As an example, if the input bin (16) is designed to hold 500 fingerprint cards (20) having an average height H=4.375 in. and an average weight W=8.75 lbs.

$$D = (2 \times H)/\pi$$

$$D = (2 \times 4.375 \text{ inches})/\pi$$

$$D = 2.785 \text{ inches} \quad \text{Equation (1)}$$

Thus, the diameter of each of the drive pulleys (40), (42) should be at least 2.875 inches in this example.

$$\tau\_d = D/2 \times W$$

$$\tau\_d = 2.785 \text{ inches}/2 \times 8.75 \text{ lbs.}$$

$$\tau\_d = 12.184375 \text{ lbs. in.} = 14.038 \text{ kg. cm.} \quad \text{Equation (2)}$$

Thus, the dynamic torque of the two servomotors (41), (43) combined should be at least 12.184375 lbs. in. or 14.038 kg. cm. in this example.

The components making up the robotic document feeder system (10) may be formed of any suitable material. In an embodiment, the scanner cover (12A) and/or the frame (23) may be formed of plastic, and may be created using a 3D printer or a plastic mold. In an embodiment, the scanner cover (12A) and/or the frame (23) are created by a Fortus 400MC 3D printer.

In an embodiment, a SSC-32 microcontroller is used to control the servomotors (41), (43) and the sensors required to run the robotic document feeder system (10). The robotic document feeder system (10) may also include pre-programming to alert the operator when certain conditions are encountered. For example, sensors at the top of the input bin (16) may detect when the input bin (16) is empty, and pre-programming may function to alert the operator as well as stop the operation.

Figure 7:
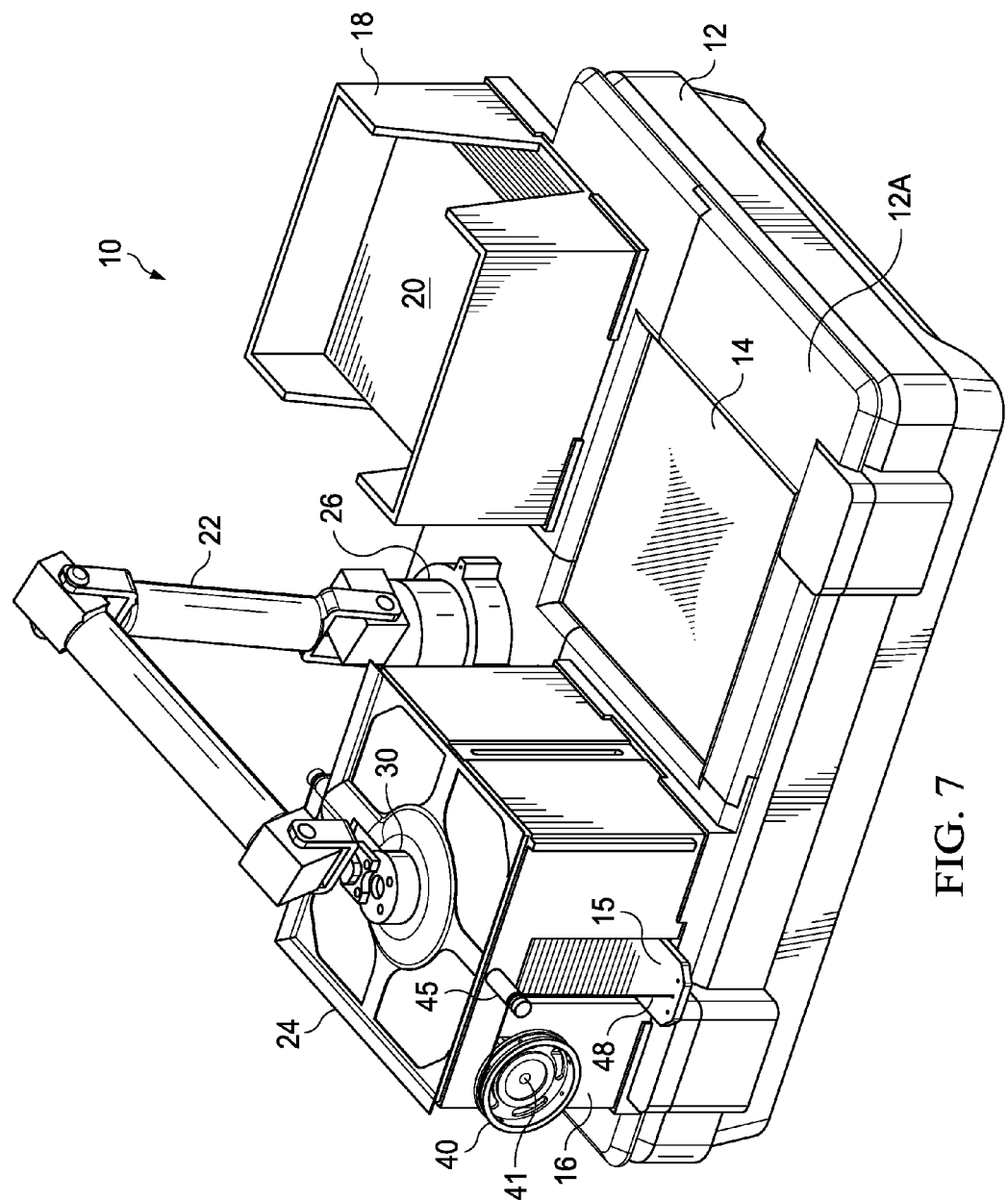
FIG. 7 depicts an isometric view of the robotic document feeder system of FIG. 1 with the Bernoulli cup assembly positioned over the top of the input bin to lift a card from the input bin according to the present disclosure.
Figure 8:
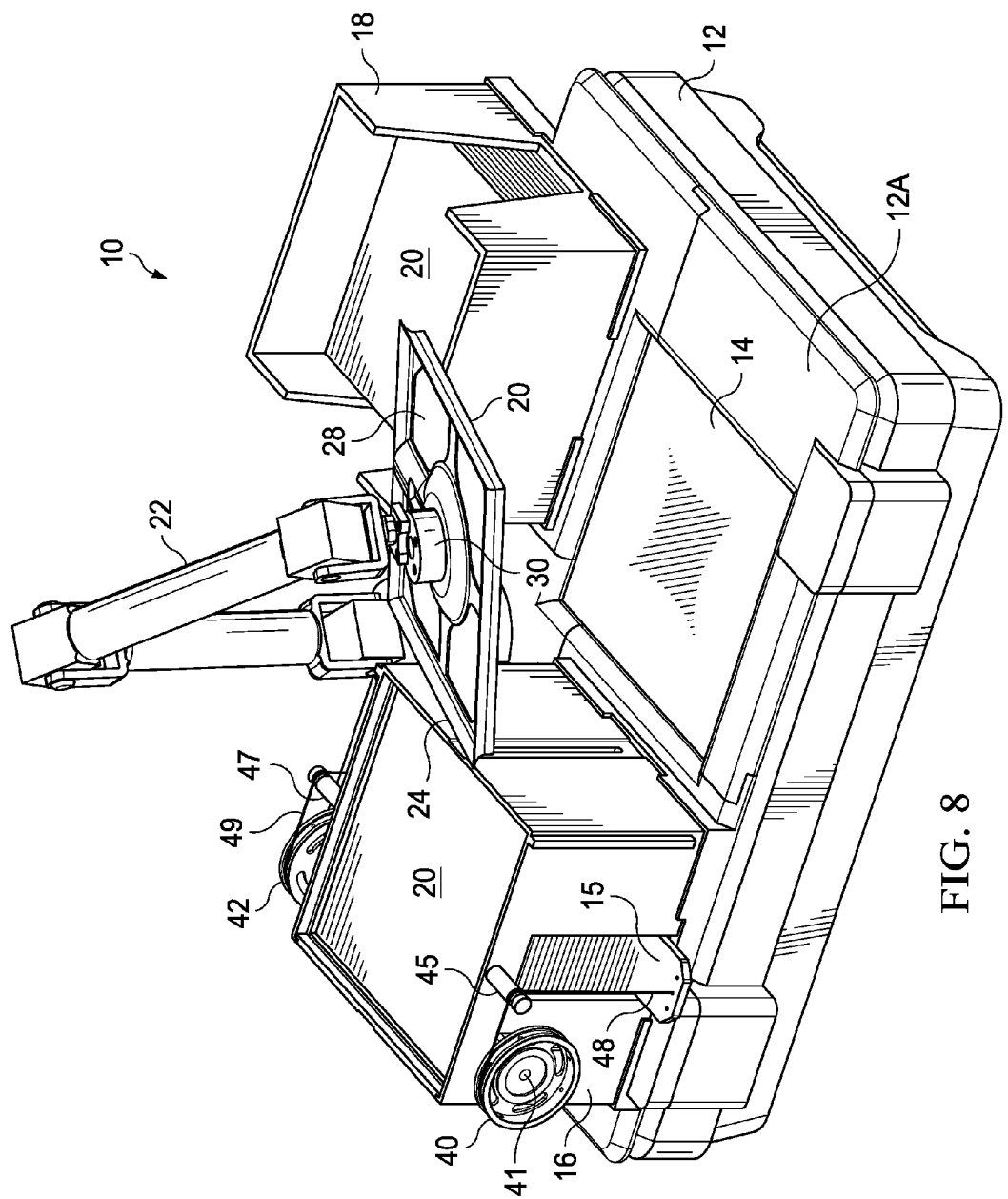
FIG. 8 depicts an isometric view of the robotic document feeder system of FIG. 1 after the Bernoulli cup assembly has lifted a card from the input bin and the robotic arm is moving the Bernoulli cup assembly with the lifted card to a document scanner according to the present disclosure.
Figure 9:
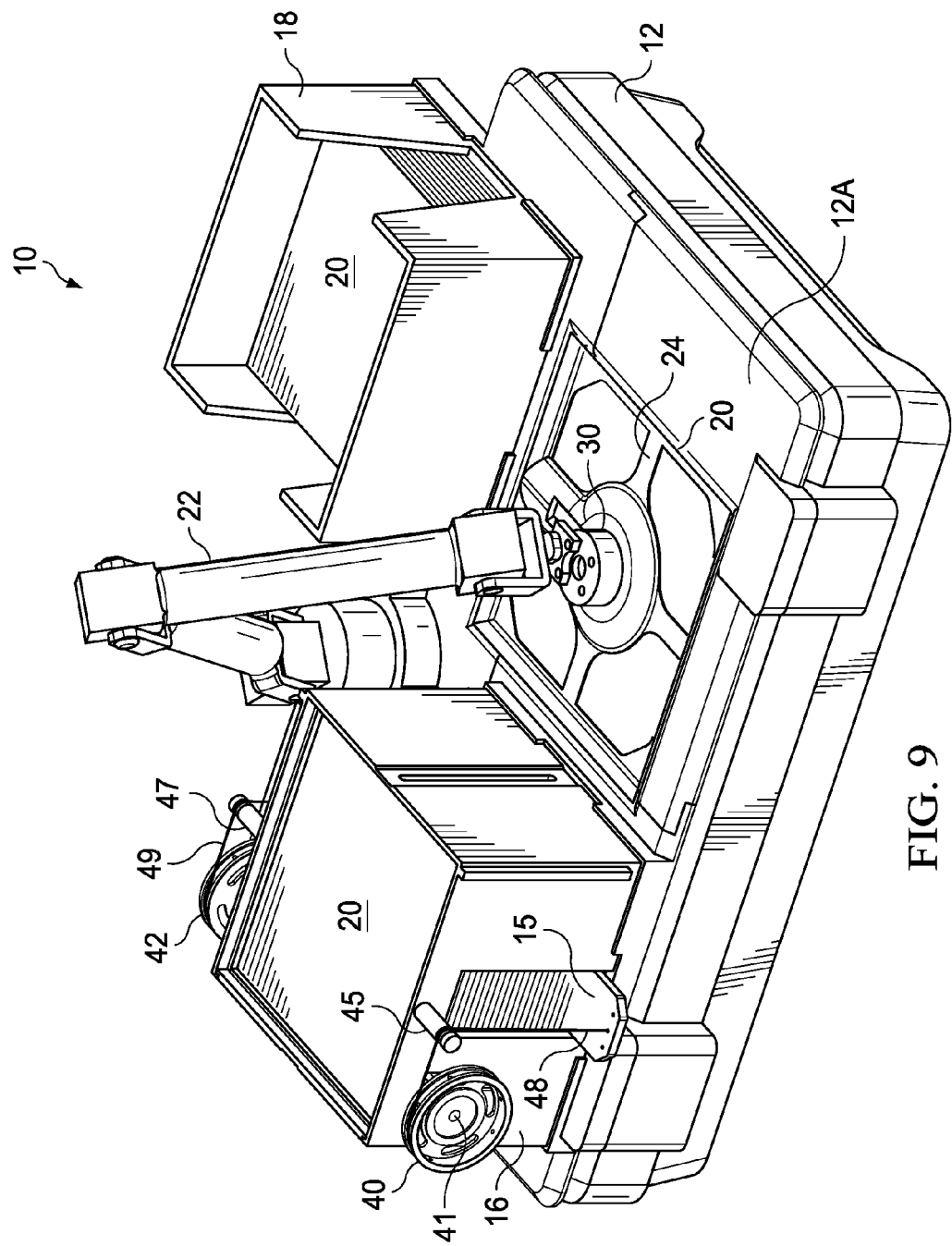
FIG. 9 depicts an isometric view of the robotic document feeder system of FIG. 1 with the Bernoulli cup assembly placing the lifted card into a scan area of the document scanner according to the present disclosure.
Figure 10:
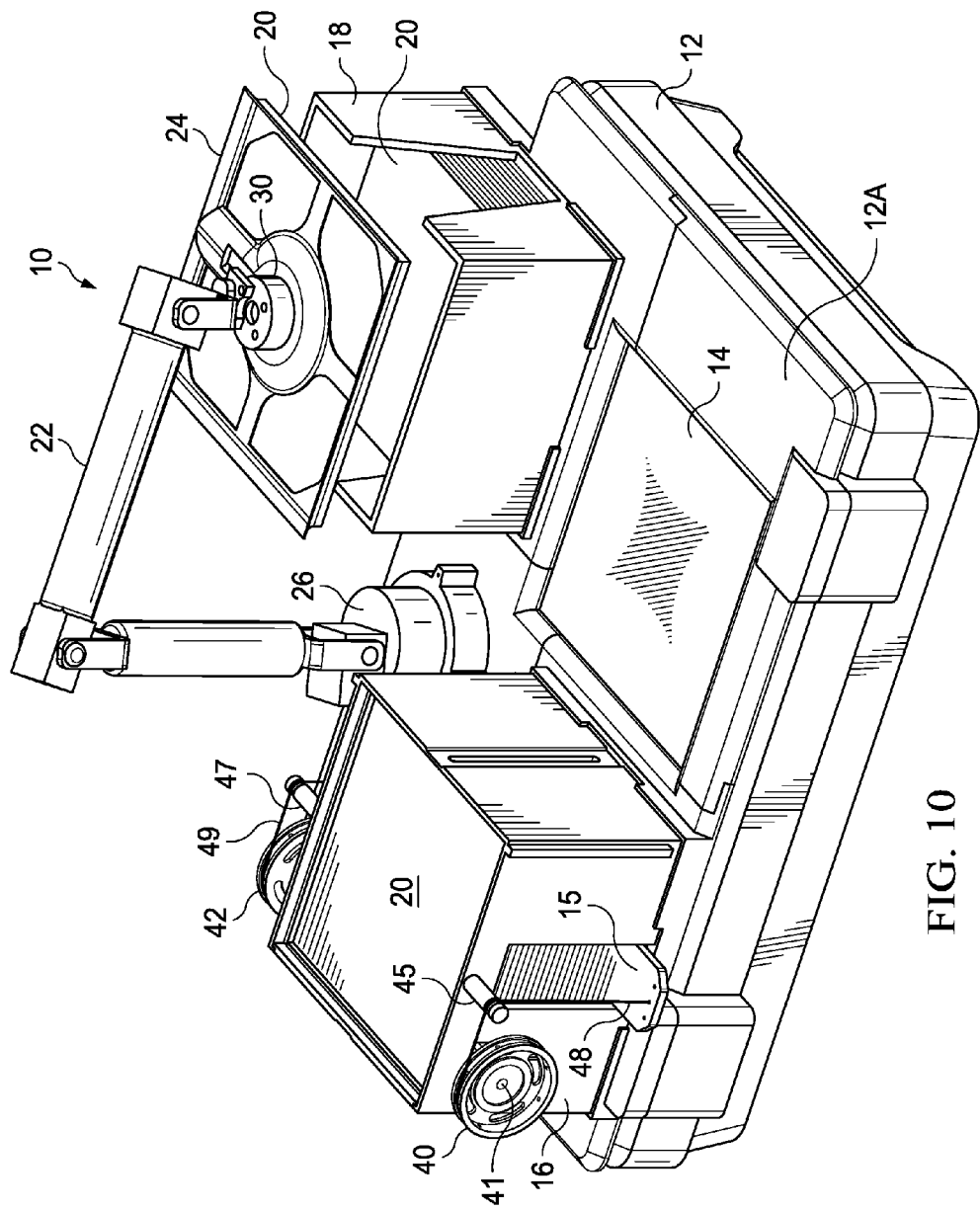
FIG. 10 depicts an isometric view of the robotic document feeder system of FIG. 1 after the Bernoulli cup assembly has lifted the card from the scan area and the robotic arm is moving the Bernoulli cup assembly with the lifted card to an output bin according to the present disclosure.
Figure 11:
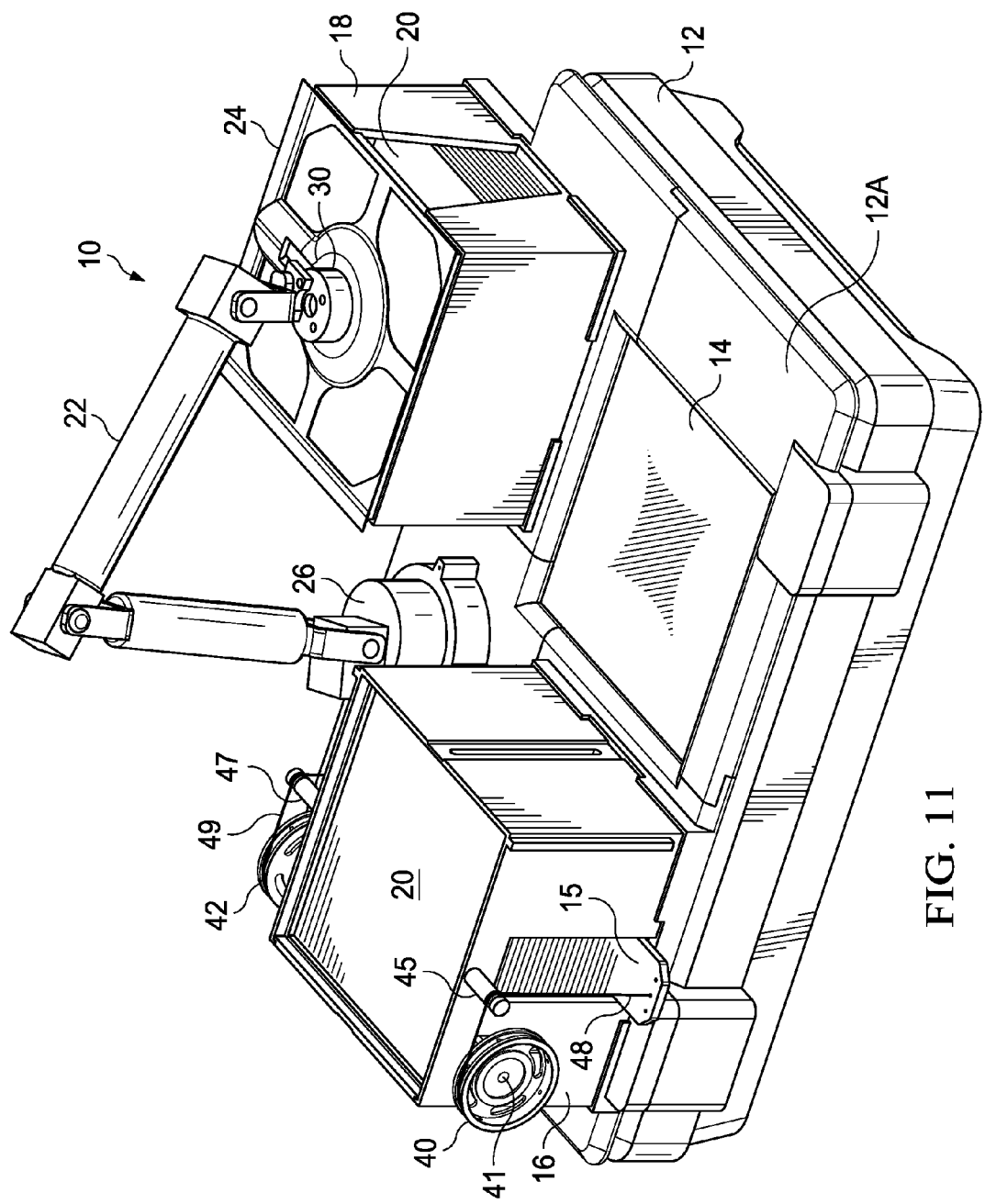
FIG. 11 depicts an isometric view of the robotic document feeder system of FIG. 1 with the Bernoulli cup assembly positioned over the top of the output bin to release the card into the output bin according to the present disclosure.

FIGS. 7-11 depict the robotic document feeder system (10) of FIG. 1 in operation to scan a fingerprint card (20) in accordance with the present disclosure. In FIG. 7, the robotic arm (22) is shown orienting the Bernoulli cup assembly (24) over the top of the input bin (16) for removing a card (20) located in the input bin (16). To lift a card (20), the solenoid valve coupled to the vacuum source is opened such that a suction pressure is created by the Bernoulli suction cup (30) and the Bernoulli cup assembly (24) retrieves the top card (20) from the input bin (16). In FIG. 8, the robotic arm (22) lifts and moves the Bernoulli cup assembly (24) with the retrieved card (20) suctioned thereto toward the scan area (14) of the scanner (12). As shown in FIG. 9, the robotic arm (22) lowers the Bernoulli cup assembly (24) such that the retrieved card (20) suctioned thereto is positioned within the scan area (14) of the scan cover (12A) for imaging by the scanner (12). Referring now to FIG. 10, after the scanner (12) images the card (20), the robotic arm (22) lifts and rotates the Bernoulli cup assembly (24) and the retrieved card (20) suctioned thereto to a position over the output bin (18). As shown in FIG. 11, robotic arm (22) then lowers the Bernoulli cup assembly (24) to position the retrieved card (20) suctioned thereto into contact with the cards (20) stored in the output bin (18). Then the solenoid valve coupled to the vacuum source is closed, thereby releasing suction pressure from the Bernoulli suction cup (30) and releasing the retrieved card into the output bin (18) where it is stored until removal by the operator.

Figure 12A:
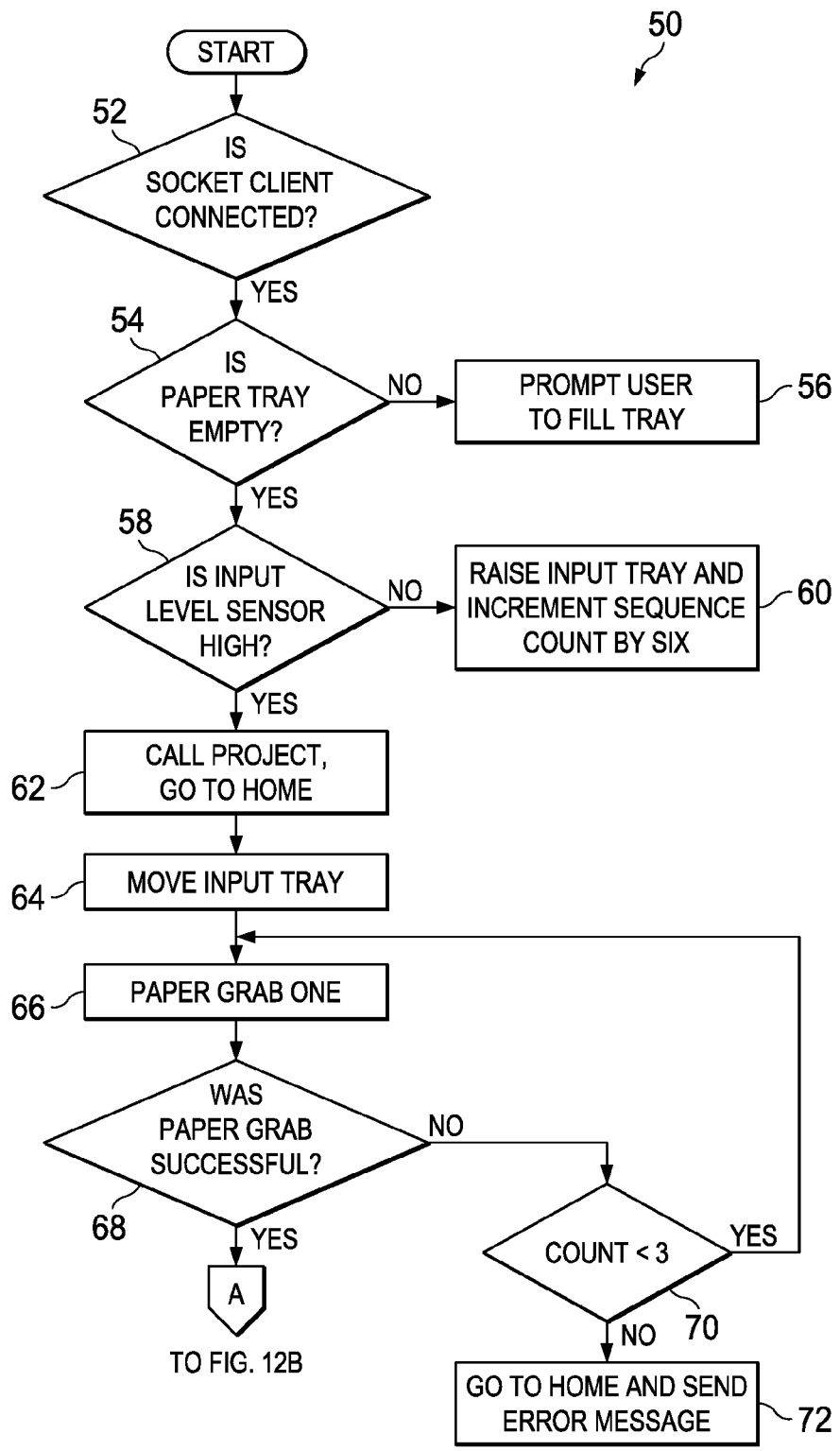
FIGS. 12A-12B is a flow chart of an embodiment of a method for imaging fingerprint cards according to the present disclosure.
Figure 12B:
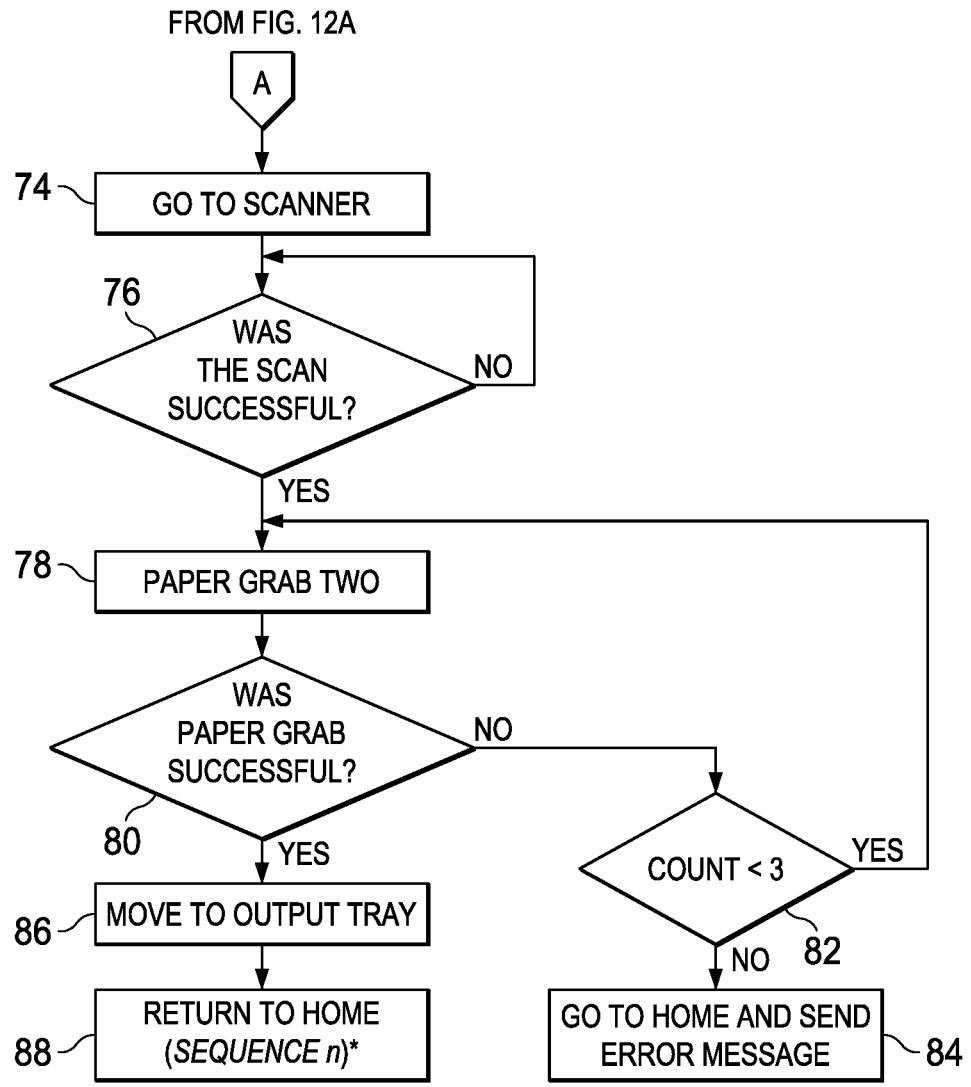

FIGS. 12A-12B depict a flowchart of a method (50) for scanning a fingerprint card (20) or other document using the robotic document feeder system (10) of FIG. 1 in accordance with the present disclosure. Referring now to FIG. 12A, at Step (52), the connection of the socket client is determined. If the socket client is connected at Step (52), then at Step (54) the condition of the paper tray or input bin (16) is determined. If the paper tray or input bin (16) is empty at Step (54), then at Step (56) the user is prompted to fill the tray or input bin (16). Once the paper tray or input bin (16) has been filled, then at Step (58) a position of the input level sensor is noted. If the input level sensor is not high at Step (58), then at Step (60) the tray (15) on the input bin (16) is raised, and the sequence count is incremented by six. If the input level sensor is high at Step (58), then at Step (62), the robotic document feeder system (10) is ready for actuation and returns to the home position. At Step (64), the input bin (16) is moved into position and at Step (66) one card (20) is grabbed from the input bin (16). At Step (68), a determination is made whether the paper grab was successful. If the paper grab was not successful at Step (68), at Step (70) a determination is made whether there have been less than 3 unsuccessful paper grabs. If there have been less than 3 unsuccessful paper grabs at Step (70), the method returns to Step (66) where the paper grab is attempted again, otherwise, at Step (72), the system (10) is returned to home and an error message is sent.

Referring now to FIG. 12B, if the paper grab was successful at Step (68), then at Step (74) the card (20) is moved to the scanner and a scan is made. At Step (76), a determination is made whether the scan was successful. If the scan was not successful at Step (76), the method returns to Step (74) to make another scan. If the scan was successful at Step (76), then at Step (78) the card (20) is grabbed from the scanner (12). At Step (80), a determination is made whether the paper grab was successful. If the paper grab was not successful at Step (80), at Step (82) a determination is made whether there have been less than 3 unsuccessful paper grabs. If there have been less than 3 unsuccessful paper grabs at Step (82), the method returns to Step (78) where the paper grab is attempted again, otherwise, at Step (84), the system (10) is returned to home and an error message is sent. If the paper grab was successful at Step (80), then at Step (86) the card (20) is moved to the output tray (18). Then at Step (88), the system (10) is returned to the "home" position to continue imaging operations for the remaining cards (20) in the input bin (16) until the input bin (16) is empty or until scanning operations are suspended by the operator.

Figure 13:
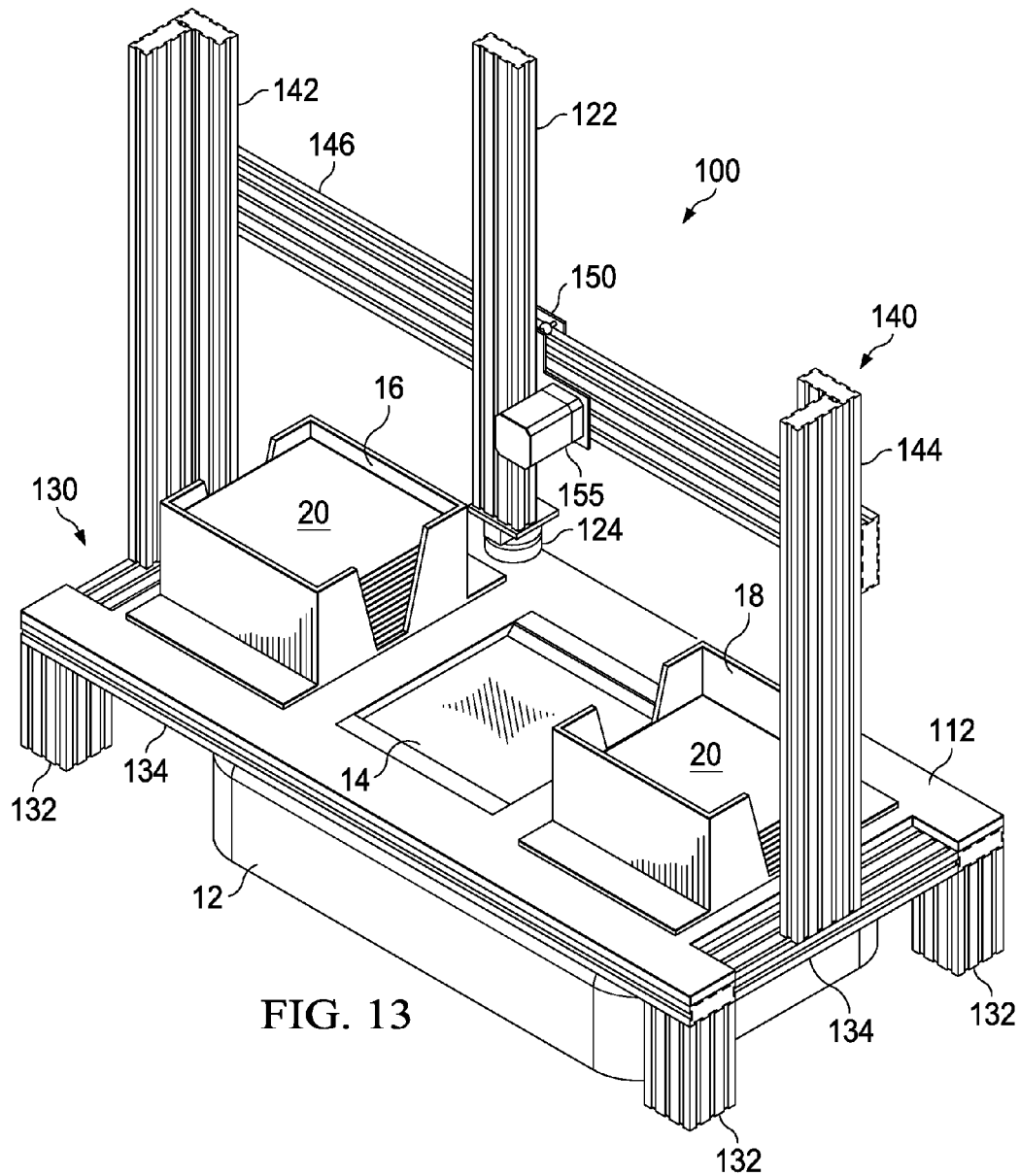
FIG. 13 depicts an isometric view of an embodiment of a robotic document feeder system with a robotic arm that moves linearly according to the present disclosure.

FIG. 13 depicts an isometric view of a linear embodiment of a robotic document feeder system (100) according to the present disclosure. Linear robotic document feeder system (100) may include similar components to those described for rotational robotic document feeder system (10), and like reference numerals are used to identify like components.

Linear robotic document feeder system (100) comprises a robotic arm (122) coupled to a rail system (140), a Bernoulli cup assembly (124) coupled to a lower end of the robotic arm (122), an input bin (16) for storing fingerprint cards (20) or other documents before imaging, a platform (130) supporting a base (112) that extends over the scanner (12), the base (112) including a through opening or scan area (14) where the fingerprint cards (20) or other documents are imaged using the scanner (12), and an output bin (18) for receiving the fingerprint cards (20) after imaging.

The rail system (140) comprises a plurality of vertical support rails (142, 144) and a horizontal support rail (146) extending therebetween. Robotic arm (122) is coupled to the rail system (140) and is operable to move laterally along the horizontal support rail (146) via a stepper motor (150). Robotic arm (122) is also operable to move vertically via a stepper motor (155) that drives a timing belt running through the robotic arm (122) to provide the vertical motion.

The platform (130) may comprise four side rails (134) coupled together at the ends thereof to create a square or rectangle, with legs (132) positioned at each corner to support the side rails (134) and lift the platform (130) to a height above the scanner (12). In an implementation, the vertical support rails (142, 144) of the rail system (140) are coupled to two opposing side rails (134) of the platform (130), such that the platform (130) also supports the rail system (140) and the robotic arm (122) over the scanner (12).

The platform (130) may further support a base (112) that extends over the scanner (12) and across the open area formed by the side rails (134). The base (112) is supported by the platform (130) that stands on its own legs (132) and does not engage the top of the scanner (12). The base (112) may provide a foundation for the input bin (16) and output bin (18) as shown in FIG. 13. The base (112) may also aid in producing consistent image size and quality by covering over substantially all areas of the imaging surface of the scanner (12) except for a designated scan area (14), which may be formed as a through opening in the base (112). In an embodiment, the scan area (14) may be sized to correspond to that portion of the fingerprint card (20) or other document that will be imaged for electronic storage.

Figure 16:
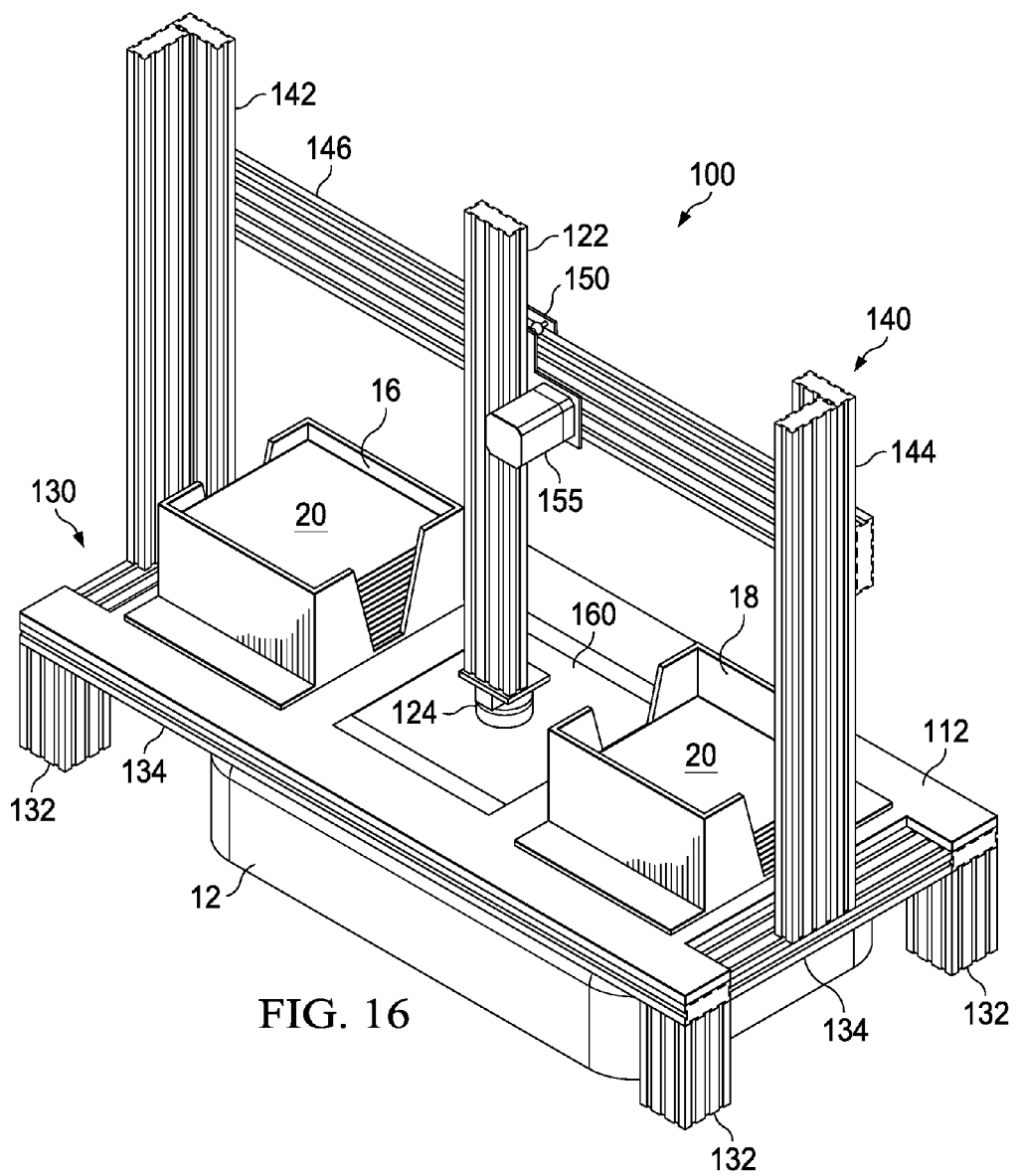
FIG. 16 depicts an isometric view of the robotic document feeder system of FIG. 13 after the lifted card has been placed into the scan area of the document scanner and a slide mechanism has covered the card for scanning according to the present disclosure.

In an implementation, the base (112) may further comprise a slide mechanism (160), depicted in an extended position in FIG. 16 and described in more detail herein. In the configuration shown in FIG. 13, the slide mechanism (160) is housed in a retracted position beneath an area of the base (112), such as beneath the output bin (18), for example. In an embodiment the slide mechanism (160) is positioned between two brackets on the underside of the base (112) and a rack-and-pinion mechanism extends and retracts the slide mechanism (160) via a servo motor.

To ensure scanning quality, when a document (20) is placed in the designated scan area (14) for imaging, the slide mechanism (160) is operable to extend over the document (20) in the scan area (14). In an implementation, the slide mechanism (160) further comprises a brush on the underside thereof that pushes the document to the edge of the scan area (14) as the slide mechanism (160) extends over the document (20).

The slide mechanism (160) thereby covers the fingerprint card (20) during scanning, which tends to enhance the quality of the image since the slide mechanism (160) limits light from leaking past the card (20) into the operating environment and producing unwanted shadows when the card (20) is scanned. When scanning is complete, the slide mechanism (160) retracts back to its initial position beneath an area of the base (112). In an implementation, the Bernoulli cup assembly (124) includes the Bernoulli suction cup (30) but does not include the frame (23) and white background (28) when the base (112) is equipped with the slide mechanism (160).

The components making up the linear robotic document feeder system (100) may be formed of any suitable material. In an embodiment, the platform (130) and/or rail system (140) may be formed from aluminum V-slot linear rails connected together by screws. The horizontal support rail (146) may be formed from an aluminum C-beam rail. The base (112) and/or slide mechanism (160) may be formed of plastic, such as an acetyl delrin, and may be created using a 3D printer or a plastic mold.

Figure 14:
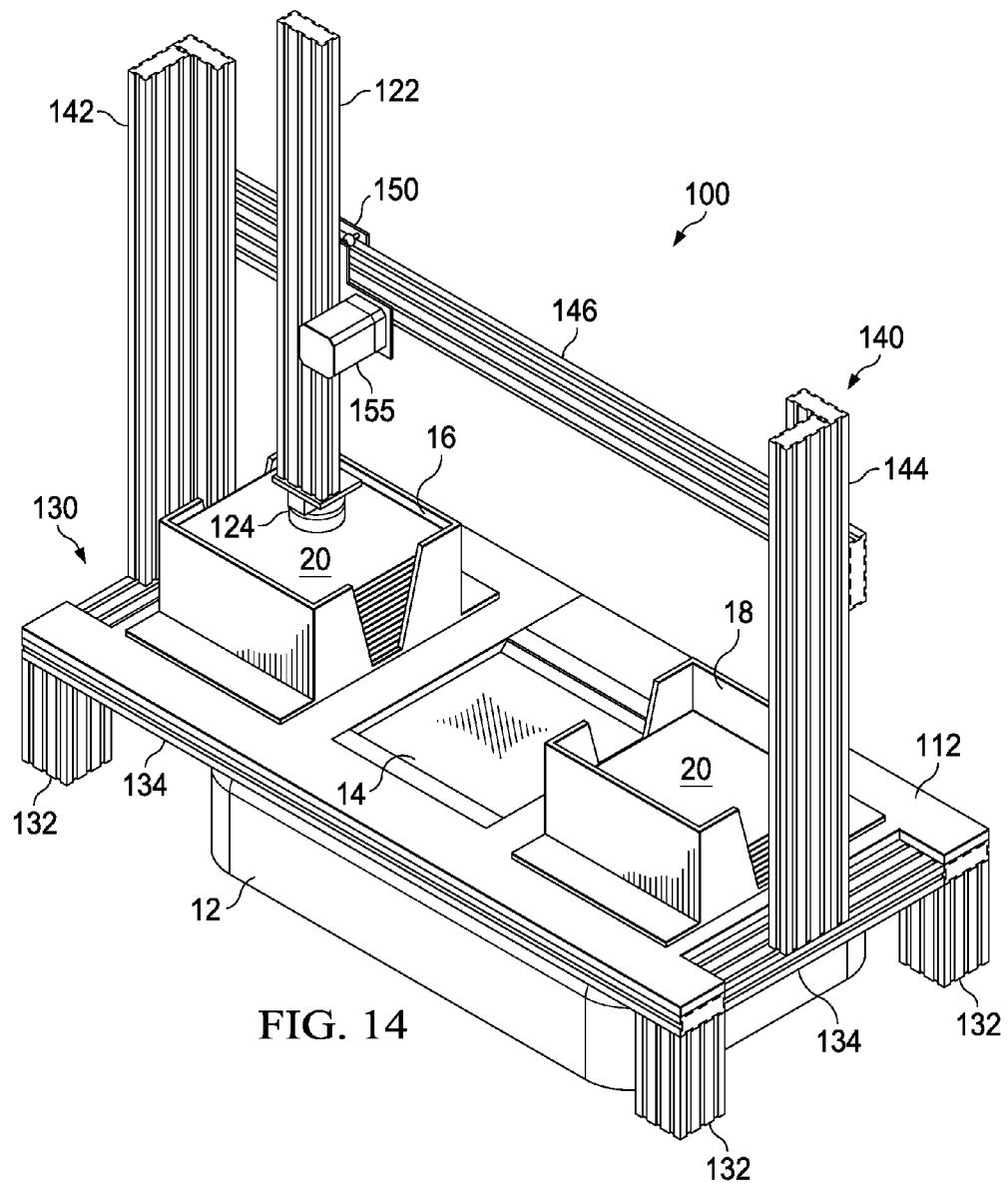
FIG. 14 depicts an isometric view of the robotic document feeder system of FIG. 13 with the Bernoulli suction cup positioned over the top of the input bin to lift a card from the input bin according to the present disclosure.
Figure 15:
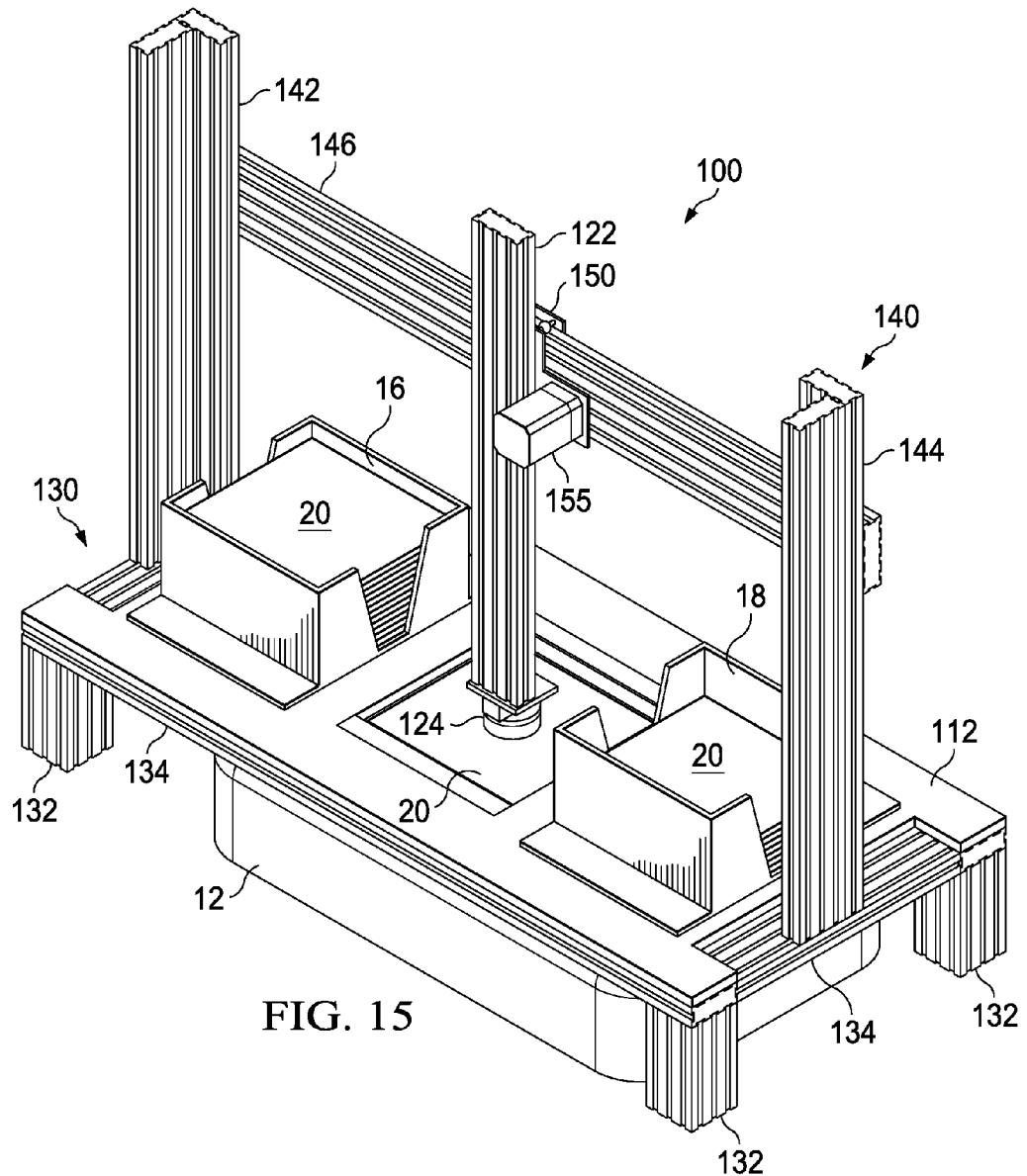
FIG. 15 depicts an isometric view of the robotic document feeder system of FIG. 13 with the Bernoulli suction cup placing the lifted card into a scan area of the document scanner according to the present disclosure.
Figure 17:
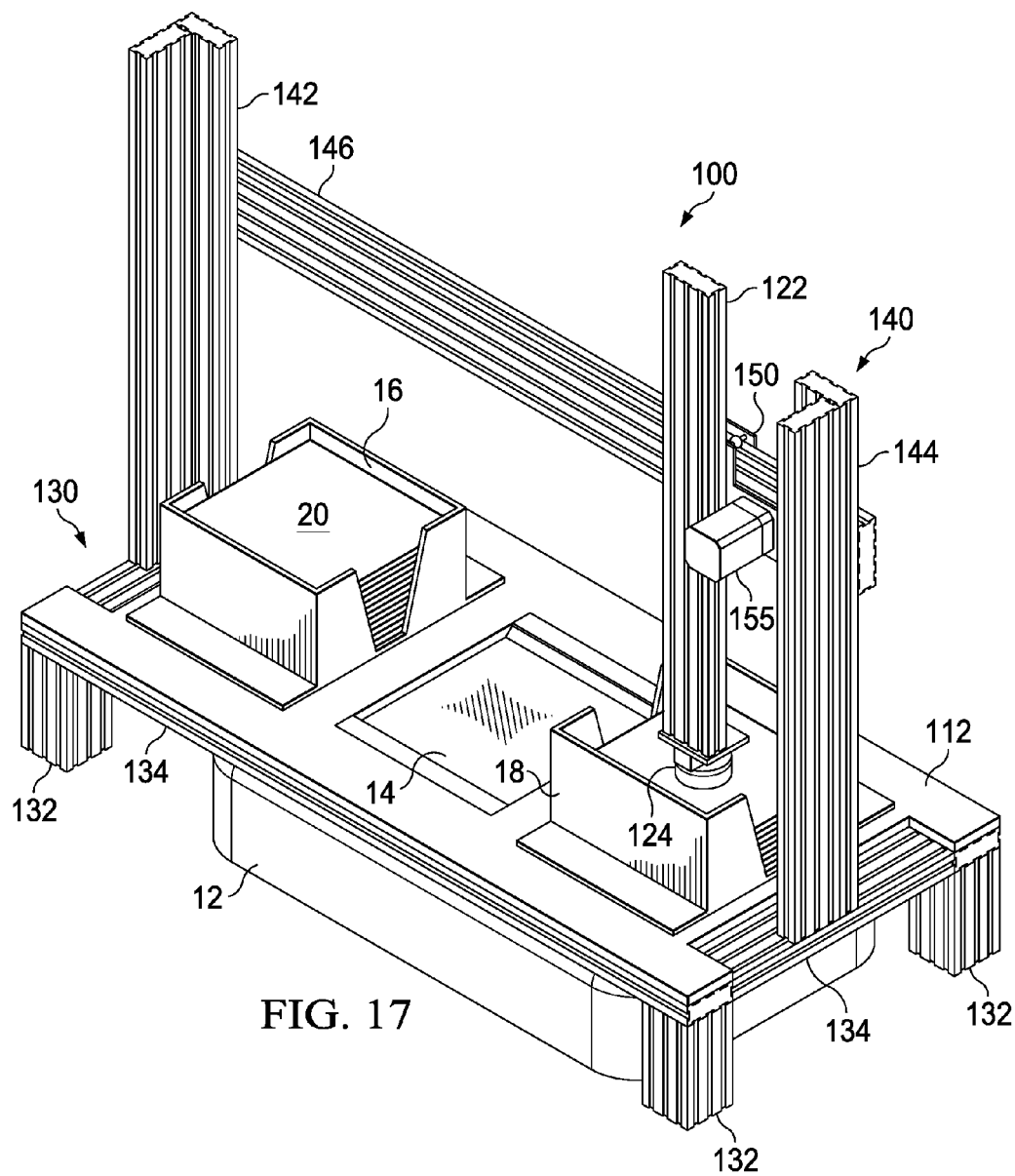
FIG. 17 depicts an isometric view of the robotic document feeder system of FIG. 13 with the Bernoulli suction cup positioned over the top of the output bin to release the card into the output bin according to the present disclosure.

FIGS. 14-17 depict the linear robotic document feeder system (100) of FIG. 13 in operation to scan a fingerprint card (20) in accordance with the present disclosure. The robotic document feeder system (100) comprises an automated system designed to scan individual documents, such as fingerprint cards (20). In FIG. 14, the robotic arm (122) is shown orienting the Bernoulli cup assembly (124) over the top of the input bin (16) for removing a card (20) located in the input bin (16). To lift a card (20), the solenoid valve coupled to the vacuum source is opened such that a suction pressure is created by the Bernoulli suction cup (30) and the Bernoulli cup assembly (124) retrieves the top card (20) from the input bin (16). The linear robotic arm (122) then translates vertically and laterally as needed to place the Bernoulli cup assembly (124) with the lifted card (20) into the scan area (14) of the base (112) for imaging using the scanner (12), as shown in FIG. 15. Referring now to FIG. 16, once the card (20) has been placed in the scan area (14), the robotic arm (122) raises up vertically to allow the slide mechanism (160) to extend from a retracted position below the base (112) to the position shown in FIG. 16 across the card (20). In some implementations, the robotic arm (122) may lower down vertically to rest on the slide mechanism (160) during scanning, as shown in FIG. 16. After the scan is complete, the slide mechanism (160) is once again retracted to its initial position, allowing the card (20) to be picked up by the Bernoulli cup assembly (124). Then the robotic arm (122) translates vertically and laterally accordingly to place the Bernoulli cup assembly (124) with the lifted card (20) over the output bin (18). As shown in FIG. 17, robotic arm (122) then lowers the Bernoulli cup assembly (124) to position the retrieved card (20) suctioned thereto into contact with the cards (20) stored in the output bin (18). Then the solenoid valve coupled to the vacuum source is closed, thereby releasing suction pressure from the Bernoulli suction cup (30) and releasing the retrieved card into the output bin (18) where it is stored until removal by the operator.

Figure 18:
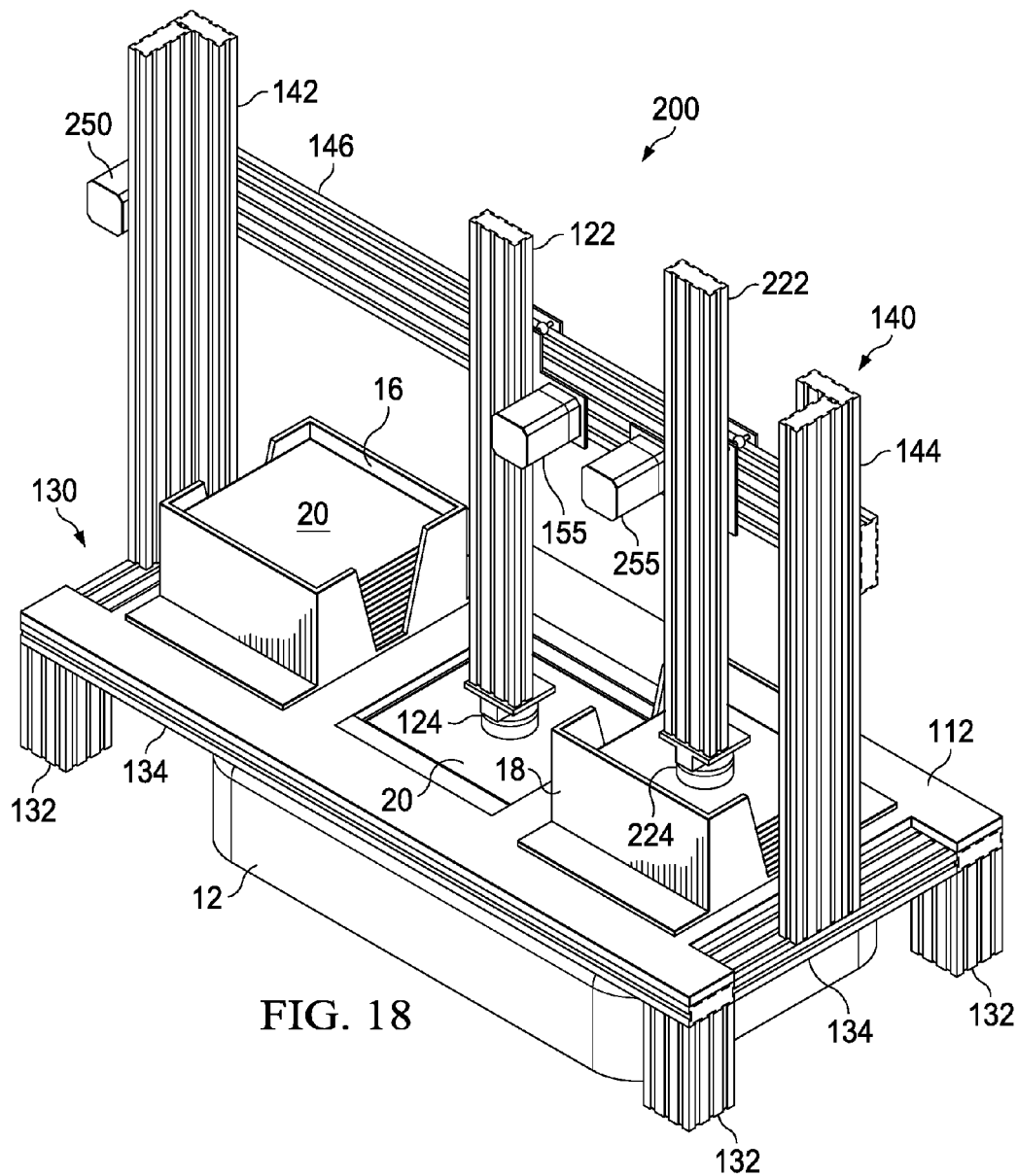
FIG. 18 depicts an isometric view of an embodiment of a robotic document feeder system with two robotic arms that move linearly according to the present disclosure.

FIG. 18 depicts an isometric view of another linear embodiment of a robotic document feeder system (200) with dual robotic arms according to the present disclosure. Linear robotic document feeder system (200) may include similar components to those described for rotational robotic document feeder system (10) and linear robotic document feeder (100), and like reference numerals are used to identify like components.

Linear robotic document feeder system (200) comprises a first robotic arm (122) coupled to a rail system (140) with a Bernoulli cup assembly (124) coupled to a lower end of the first robotic arm (122), and a second robotic arm (222) coupled to the rail system (140) with a Bernoulli cup assembly (224) coupled to a lower end of the second robotic arm (222).

In an implementation, the first robotic arm (122) and the second robotic arm (222) may move horizontally together and move vertically independently. For horizontal movement, the first robotic arm (122) and the second robotic arm (222) are operable to move laterally in tandem along the horizontal support rail (146) via a single stepper motor (250) that may be positioned at one end of the support rail (146). For vertical movement, the first robotic arm (122) and the second robotic arm (222) are operable to move vertically independently via a first stepper motor (155) that drives a timing belt running through the first robotic arm (122) and a second stepper motor (255) that drives a timing belt running through the second robotic arm (222) to provide the vertical motion.

The linear robotic document feeder system (200) with dual robotic arms (122, 222) operates in essentially the same manner as the linear robotic document feeder system (100), but more efficiently because this configuration reduces the horizontal distance that each of the robotic arms (122, 222) has to travel. In particular, the first robotic arm (122) may pick up a first card (20) from the input bin (16) and deliver the first card (20) to the scan area (14). When scanning is complete, the second robotic arm (222) may pick up the first card (20) from the scan area (14) and deliver the first card (20) to the output bin (18). Either of the robotic arms (122, 222) may be programmed to remain with a card (20) and rest on the slide mechanism (160) during scanning.

Since the robotic arms (122, 222) can operate laterally together and vertically independently, the speed may increase as the operation continues because the first robotic arm (122) can deliver a second card (20) to the scan area (14) while the second robotic arm (222) is delivering the first card (20) to the output bin (18), for example. Thus, because the two robotic arms (122, 222) can split the tasks, the cycle time may be reduced by up to 50%.

Illustrative embodiments have been described herein and it will be apparent to those skilled in the art that the systems and methods disclosed herein may incorporate changes and modifications without departing from the general scope of the disclosure. It is intended to include all such changes and modifications within the scope of the present disclosure.

The invention claimed is:

1. A system comprising:
a robotic arm operable to move linearly but not rotationally;
a Bernoulli cup assembly powered by a vacuum source and coupled to the robotic arm, wherein when the vacuum source is activated, the Bernoulli cup assembly creates sufficient suction pressure to lift a document and wherein the robotic arm is configured to move the Bernoulli cup assembly with the lifted document to a document scanner for imaging the document;
a platform with legs supporting a base positioned over an imaging surface of the document scanner, wherein the base comprises a designated scan area formed as a through opening in the base; and
a slide mechanism operable, via a rack-and-pinion mechanism in mechanical communication with a servo motor, to be retracted to a first position below a portion of the base and to be extended to a second position across the through opening of the base.

2. A system comprising:
a robotic arm operable to move linearly but not rotationally, the robotic arm coupled to a Bernoulli cup assembly powered by a vacuum source;
an input bin for storing at least one document;
an output bin;
a base disposed over an imaging surface of a document scanner and supported by a platform, wherein the base comprises a designated scan area through which a document may be imaged by the document scanner; and
a slide mechanism operable, via a rack-and-pinion mechanism in mechanical communication with a servo motor, to be retracted to a first position below a portion of the base and to be extended to a second position across the designated scan area.

* * * * *